United States Patent
Roberts

(10) Patent No.: US 11,693,410 B2
(45) Date of Patent: Jul. 4, 2023

(54) OPTIMIZING A NAVIGATION PATH OF A ROBOTIC DEVICE

(71) Applicant: Alarm.com Incorporated, Tysons, VA (US)

(72) Inventor: Aaron Lee Roberts, Centreville, VA (US)

(73) Assignee: Alarm.com Incorporated, Tysons, VA (US)

( * ) Notice: Subject to any disclaimer, the term of this patent is extended or adjusted under 35 U.S.C. 154(b) by 101 days.

(21) Appl. No.: 17/328,094

(22) Filed: May 24, 2021

(65) Prior Publication Data

US 2021/0278845 A1    Sep. 9, 2021

Related U.S. Application Data

(63) Continuation of application No. 16/149,073, filed on Oct. 1, 2018, now Pat. No. 11,016,487.

(60) Provisional application No. 62/566,234, filed on Sep. 29, 2017.

(51) Int. Cl.
*G05D 1/00*    (2006.01)
*G08B 13/196*  (2006.01)
*G01C 21/20*   (2006.01)
*G06V 20/52*   (2022.01)

(52) U.S. Cl.
CPC .......... *G05D 1/0094* (2013.01); *G01C 21/20* (2013.01); *G08B 13/19606* (2013.01); *G08B 13/19608* (2013.01); *G06V 20/52* (2022.01)

(58) Field of Classification Search
CPC .............. G05D 1/0094; G01C 21/20; G08B 13/19606; G08B 13/19608; G06V 20/52
See application file for complete search history.

(56) References Cited

U.S. PATENT DOCUMENTS

| | | | |
|---|---|---|---|
| 8,965,598 B2 | 2/2015 | Kruglick | |
| 10,137,984 B1 | 11/2018 | Flick | |
| 2004/0186739 A1 | 9/2004 | Bolles et al. | |
| 2015/0070181 A1 | 3/2015 | Fadell et al. | |
| 2015/0161449 A1* | 6/2015 | Armendariz | H04N 5/77 348/159 |
| 2015/0339912 A1 | 11/2015 | Farrand et al. | |
| 2015/0367513 A1 | 12/2015 | Gettings et al. | |

(Continued)

*Primary Examiner* — Calvin Cheung
(74) *Attorney, Agent, or Firm* — Fish & Richardson P.C.

(57) ABSTRACT

Methods, systems, and apparatus, including computer programs encoded on a storage device, for using a drone to monitor a community. The drone may include a processor and a storage device storing instructions that, when executed by the processor, cause the one or more processors to perform operations. The operations may include receiving an instruction to deploy based on a determination, by a community monitoring system that an event was detected at a property of the community, navigating towards the property along an initial navigation path, obtaining local monitoring system data from a local monitoring system of a property of the community, generating based on the local monitoring system data a navigational model that identifies a location of each of one or more surveillance objectives, determining an adjusted navigation path to a location of a surveillance objective of the one or more surveillance objectives, and navigating along the adjusted navigation path.

20 Claims, 4 Drawing Sheets

(56) References Cited

U.S. PATENT DOCUMENTS

| | | |
|---|---|---|
| 2016/0107749 A1* | 4/2016 | Mucci .................. B64C 39/024 701/3 |
| 2016/0125713 A1 | 5/2016 | Blech et al. |
| 2016/0180719 A1 | 6/2016 | Wouhaybi et al. |
| 2016/0266577 A1 | 9/2016 | Kerzner |
| 2016/0358432 A1 | 12/2016 | Branscomb et al. |
| 2017/0185849 A1 | 6/2017 | High et al. |
| 2017/0187993 A1 | 6/2017 | Martch et al. |
| 2018/0027772 A1 | 2/2018 | Gordon et al. |
| 2018/0090016 A1 | 3/2018 | Nishi et al. |

* cited by examiner

200

```
┌─────────────────────────────────────────────────────────────┐
│ RECEIVE AN INSTRUCTION TO DEPLOY BASED ON A DETECTED EVENT  │
│                                                         210 │
└─────────────────────────────────────────────────────────────┘
                              │
                              ▼
┌─────────────────────────────────────────────────────────────┐
│ OBTAIN MONITORING SYSTEM DATA FROM LOCAL                    │
│ MONITORING SYSTEMS ASSOCIATED WITH THE EVENT            220 │
└─────────────────────────────────────────────────────────────┘
                              │
                              ▼
┌─────────────────────────────────────────────────────────────┐
│ GENERATE A NAVIGATIONAL MODEL BASED ON                      │
│ THE OBTAINED MONITORING SYSTEM DATA                     230 │
└─────────────────────────────────────────────────────────────┘
                              │
                              ▼
┌─────────────────────────────────────────────────────────────┐
│ IDENTIFY ONE OR MORE SURVEILLANCE OBJECTIVES            240 │
└─────────────────────────────────────────────────────────────┘
                              │
                              ▼
┌─────────────────────────────────────────────────────────────┐
│ IDENTIFY A LOCATION ASSOCIATED WITH EACH OF                 │
│ THE ONE OR MORE SURVEILLANCE OBJECTIVES                 250 │
└─────────────────────────────────────────────────────────────┘
                              │
                              ▼
┌─────────────────────────────────────────────────────────────┐
│ DETERMINE AN OPTIMIZED NAVIGATION PATH                      │
│ TO THE ONE OR MORE LOCATIONS                            260 │
└─────────────────────────────────────────────────────────────┘
```

```
┌─────────────────────────────────────────────────────────┐
│ OBTAIN MONITORING SYSTEM DATA FROM LOCAL                │
│ MONITORING SYSTEMS ASSOCIATED WITH THE EVENT      310   │
└─────────────────────────────────────────────────────────┘
                            ↓
┌─────────────────────────────────────────────────────────┐
│ GENERATE A NAVIGATIONAL MODEL BASED ON                  │
│ THE OBTAINED MONITORING SYSTEM DATA              320    │
└─────────────────────────────────────────────────────────┘
                            ↓
┌─────────────────────────────────────────────────────────┐
│ IDENTIFY ONE OR MORE SURVEILLANCE OBJECTIVES     330    │
└─────────────────────────────────────────────────────────┘
                            ↓
┌─────────────────────────────────────────────────────────┐
│ IDENTIFY A LOCATION ASSOCIATED WITH EACH OF             │
│ THE ONE OR MORE SURVEILLANCE OBJECTIVES          340    │
└─────────────────────────────────────────────────────────┘
                            ↓
┌─────────────────────────────────────────────────────────┐
│ DETERMINE AN OPTIMIZED NAVIGATION PATH                  │
│ TO THE ONE OR MORE LOCATIONS                     350    │
└─────────────────────────────────────────────────────────┘
                            ↓
┌─────────────────────────────────────────────────────────┐
│ PROVIDING DATA DESCRIBING THE                           │
│ OPTIMIZED NAVIGATION PATH TO A DRONE             360    │
└─────────────────────────────────────────────────────────┘
```

FIG. 3

OPTIMIZING A NAVIGATION PATH OF A ROBOTIC DEVICE

CROSS-REFERENCE TO RELATED APPLICATIONS

This application is a continuation of U.S. application Ser. No. 16/149,073, filed Oct. 1, 2018, now allowed, which claims the benefit of U.S. Provisional Patent Application No. 62/566,234 filed Sep. 29, 2017 and entitled "Optimizing a Navigation Path of a Robotic Device." Both of these prior applications are incorporated by reference in their entirety.

BACKGROUND

A robotic device, referred to herein as a drone, can be used to perform surveillance one or more properties. The drone may include a rolling drone, a flying drone, aquatic drone, or a combination thereof. Surveillance of a property may include the drone navigating throughout the property using one or more drone-mounted sensors, detectors, cameras, or a combination thereof to obtain information about the property. The drone can then perform one or more surveillance operations based on the obtained information.

SUMMARY

According to one innovative aspect of the present disclosure, a system for optimizing a navigation path of a drone device is disclosed. A drone device may include one or more processors and one or more storage devices, the one or more storage devices storing instructions that, when executed by the one or more processors, cause the one or more processors to perform operations. The operations may include receiving, by the drone device, an instruction to deploy based on a determination, by a community monitoring system that is configured to monitor multiple properties in a community, that an event was detected at a property of the multiple properties in the community, wherein each of the multiple properties is monitored by one of multiple local monitoring systems, navigating, by the drone device, towards the property along an initial navigation path, obtaining, by the drone device, local monitoring system data from a local monitoring system of the multiple local monitoring systems, generating, by the drone device and based on the local monitoring system data, a navigational model that includes a spatial representation of geographic features that (i) represents at least a portion of a geographic region and (ii) identifies a location of each of one or more surveillance objectives, determining, by the drone device and based on the navigation model, an adjusted navigation path to a location of a surveillance objective of the one or more surveillance objectives, and navigating, by the drone device, along the adjusted navigation path.

Other aspects include corresponding methods, apparatus, and computer programs to perform actions of methods defined by instructions encoded on computer storage devices.

These and other versions may optionally include one or more of the following features. For instance, in some implementations, obtaining, by the drone device, local monitoring system data from a local monitoring system of the multiple monitoring systems may include accessing, by the drone device, a collaborative network, wherein the collaborative network enables the drone device to access local monitoring system data generated by one or more of the multiple local monitoring systems, and obtaining, by the drone device and using the collaborative network, monitoring system data from a local monitoring unit located at one or more properties that neighbor the property where the event was detected.

In some implementations, the navigational model may include a geographic representation of a location of one or more structures in the community, a location of one or more vehicles in the community, areas of the property within a field of view of a camera installed at the property, or areas of the property that are not within a field of view of a camera installed at the property.

In some implementations, the navigational model may include a three-dimensional model.

In some implementations, generating, by the drone device and based on the local monitoring system data, a navigational model may include determining, by the drone device and based the local monitoring system data from the local monitoring system, that a human is related to the event, determining, by the drone and based on the local monitoring system data from the local monitoring system, a predicted travel path of the human, and mapping, by the drone, the predicted travel path of the human to the navigational model.

In some implementations, the local monitoring system data from the local monitoring system includes a series of time stamped image data items. In such implementations, determining, by the drone and based on an analysis of the local monitoring system data from the local monitoring system, a predicted travel path of the human may include identifying, by the drone device, a representation of the human in each of the series of time stamped image data items, determining, by the drone device, relative movements of the human based on a position of the representation of the human in each of the series of time stamped image data items, and determining, by the drone device, the predicted path of travel of the human based on the relative movements of the representation of the human in each of the series of time stamped image data items.

In some implementations, the operations may further include determining, by the drone, an order of priority for each of the one or more surveillance objectives.

In some implementations, the one or more surveillance objectives may include (i) a first surveillance objective that includes obtaining an image or a video of a face of a human that is determined to be a potential trespasser, (ii) a second surveillance objective that includes obtaining an image or a video of one or more vehicles in a vicinity of the property, and (iii) a third surveillance objective that includes tracking a human that is determined to be a potential trespasser and is fleeing the property.

In some implementations, the first surveillance objective is associated with a higher level of priority than a respective level of priority that is associated with the second surveillance objective and the third surveillance objective, the second surveillance objective is associated with a lower level of priority than a level of priority associated with the first surveillance objective and a higher level of priority than a level of priority associated with the third surveillance objective, the third surveillance objective is associated with a lower level of priority than a respective level of priority that is associated with the first surveillance objective and the second surveillance objective.

In some implementations, identifying, by the drone device and based on the monitoring system data, a location of each of the one or more surveillance objectives, wherein identifying the location of each of the one or more surveillance objectives may include identifying, by the drone device, a representation of a human in one or more time stamped image data items obtained from the local monitoring system, and determining, by the drone device and based on the one or more time stamped image data items, a location of the human based on an analysis of the human relative to environmental surroundings depicted in the one or more time stamped images.

In some implementations, determining, by the drone device and based on the navigational model, an adjusted navigation path to a location of a surveillance objective of the one or more surveillance objectives may include identifying, by the drone and based on the local monitoring system data, a particular surveillance objective of the one or more surveillance objectives based on a level of priority associated with each of the one or more surveillance objectives, and determining, by the drone and based on the monitoring system data, the adjusted navigation path to a location of the particular surveillance objective.

In some implementations, determining, by the drone device and based on the navigational model, an adjusted navigation path to a location of a surveillance objective of the one or more surveillance objectives may include determining, by the drone and based on the local monitoring system data, a particular surveillance objective, from among the one or more surveillance objectives, that is associated with a higher level of priority than a level of priority associated with each of the other one or more surveillance objectives, and determining, by the drone and based on the local monitoring system data, the adjusted navigation path to a location of the particular surveillance objective.

In some implementations, the navigational model is generated (i) based camera data describing a field of view of one or more cameras located at the property and (ii) includes data identifying regions of the property that fall within camera blind spots. In such implementations, the operations further may further include determining, by the drone and based on the navigational model, that a human has passed through a camera blind spot while moving away from the property. In such implementations, determining, by the drone device, the adjusted navigation path may include based on determining, by the drone device and based on the navigational model, that the human object has passed through a camera blind spot while fleeing the property, determining, by the drone device, a current location of the human who is fleeing the property, and determining, by the drone device, a navigation path to a location of the human who is fleeing the property.

In some implementations, determining, by the drone, a current location of the human who is fleeing the property may include identifying, by the drone device, a representation of the human in one or more time stamped image data items obtained from the local monitoring system, and determining, by the drone device and based on the one or more time stamped image data items, a location of the human based on an analysis of the representation of the human relative to environmental surroundings depicted in the one or more time stamped images.

In some implementations, the navigational model is generated (i) based camera data describing a field of view of one or more cameras located at the property and (ii) includes data identifying regions of the property that fall within an area of the property that is visible to one or more cameras. In such implementations, the operations may further include determining, by the drone and based on the navigational model, that a human has passed through the area of the property that is visible to the one or more cameras. In such implementations, determining, by the drone device, the adjusted navigation path may include based on determining, by the drone and based on the navigational model, that the human has passed through an area of the property that is visible to the one or more cameras, determining, by the drone, a current location of another surveillance objective other than capturing an image of a face the human object, and determining, by the drone device, a navigation path towards the current location of the other surveillance objective.

BRIEF DESCRIPTION OF THE DRAWINGS

FIG. 2 is a flowchart of an example of a process for optimizing a navigation path of a drone.

FIG. 3 is a flowchart of another example of a process for optimizing a navigation path of a drone.

DETAILED DESCRIPTION

Figure 1:
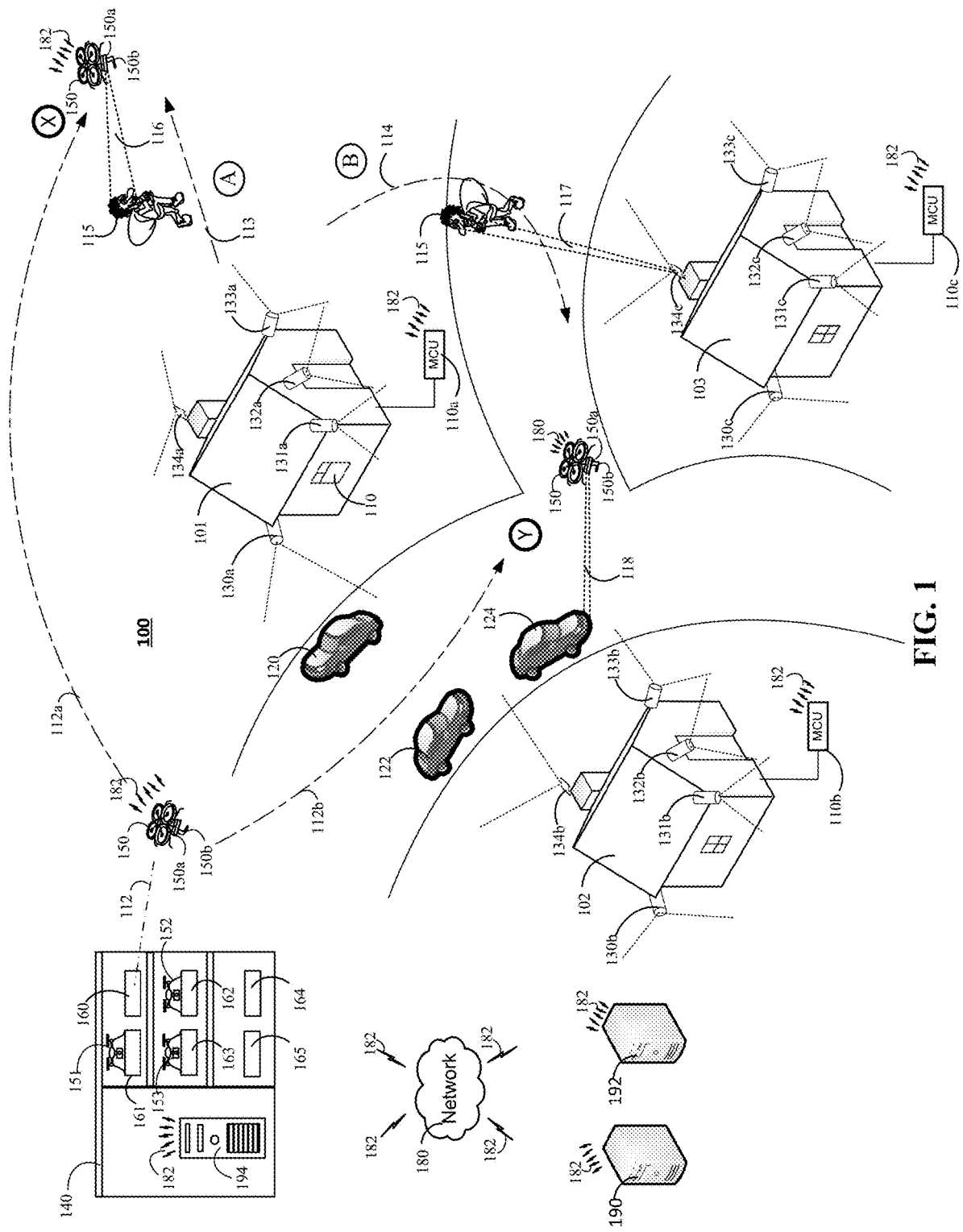
FIG. 1 is a contextual diagram of an example of a community monitoring system for optimizing a navigation path of a drone.

A community monitoring system may include one or more drones that are used to monitor events that occur in a neighborhood. A monitoring application server is configured to receive monitoring system data from one or more monitoring system control units installed at respective properties in a community. The monitoring system data may include image data, sensor data, or the like. Alternatively, or in addition the monitoring system data may include a notification from a monitoring system control unit indicating that a potential event was detected. The monitoring application server can process the received monitoring system data and determine whether it is likely that an event is occurring at an initial location in the community. In response to determining that a potential event is likely occurring, the monitoring application server can transmit an instruction to a monitoring station server that instructs the monitoring station server to deploy a drone to the initial location of the community to investigate the potential event. Alternatively, in other implementations, the monitoring application server may transmit one or more instructions to the drone that instruct the drone to deploy to the initial location of the community to investigate the potential event, without first communicating with the monitoring station server.

In some implementations, the drone can deploy from the monitoring station towards the initial location upon receiving an instruction to investigate an event. During navigation to the initial location, the drone can determine an optimized navigation path. The drone can receive monitoring system data from one or more monitoring system control units (or other components of the respective monitoring systems) that are associated with the potential event. For example, the drone may receive image data, sensor data, and the like from the monitoring system control units (or other components of the respective monitoring systems). The drone may generate a navigational model of the community based on the received monitoring system data. The drone can analyze the monitoring system data to identify one or more surveillance objectives, and mark the one or more locations associated with the surveillance objectives on the navigational model. The drone can determine a direct route to the location associated with a first surveillance objective of the one or more surveillance objectives. The drone can generate an optimized navigation path by adjusting the drone's initial navigation path to navigate towards the location associated with the first surveillance objective.

In some implementations, a drone may identify surveillance objectives by analyzing monitoring system data such as image data to determine whether the image data identifies captured evidence related to the potential event such as a face of a trespasser, a license plate of a vehicle that may be associated with the trespasser, or the like. In some implementations, the monitoring system data may be received from multiple different monitoring system control units. For example, the drone can receive and analyze image data from multiple different monitoring system control units that are reach associated with a different property in the community to determine if a camera of the multiple cameras spread amongst different properties captured evidence related to the potential event such as the face of an intruder. In response to determining that an image of the face of an intruder has been captured, the drone may prioritize other surveillance objectives such as capturing license plate data from one or more cars in the vicinity of the detected event. In such instances, the drone may adjust the drone's navigation path away from the initial location and towards the one or more cars in the vicinity of the property associated with the potential event.

Alternatively, by way of another example, the drone may determine, based on analysis of image data received from one or more monitoring system control units that an image of a fleeing trespasser's face has not been captured. The drone may determine the direction of the fleeing trespasser based on sensor data received from one or more monitoring system control units in the vicinity of the event. Based on the direction the fleeing intruder was heading, and the drone's analysis of image data form one or more of the monitoring system control units in the vicinity of the potential event, the drone can determine that the fleeing trespasser is fleeing in a direction that does not have any cameras that can capture an image of the fleeing trespasser's face. In such instances, the drone can prioritize navigating towards the fleeing trespasser in an attempt to capture an image of the fleeing trespasser's face. The drone can then adjust the drone's navigation path away from the initial location and towards the direction of the fleeing trespasser and attempt to obtain an image of the fleeing trespasser's face.

The drone can compile a set of these, and other, surveillance objectives, prioritize the surveillance objectives based on an analysis of monitoring system data received from one or more monitoring system control units associated with the potential event, and adjust the drone's navigation path to investigate the highest ranked surveillance objective for which the one or more monitoring system control units were not able to capture sufficient data. A monitoring system control unit may not be able to capture sufficient data for a variety of reasons such as, for example, being unable to capture an image of a trespasser's face, a trespasser's license plate, or the like due to camera blind spots.

The aforementioned operations were generally described as being performed by a drone. That is, the drone is able to receive monitoring system data, analyze the monitoring system data, generate a navigational model, identify security objections, and adjust the drone's navigation path so that the drone navigates towards one or more of the identified security objections. However, the present disclosure need not be so limited. For example, in some implementations, one or more of the aforementioned operations may be performed by the monitoring application server. In some implementations, each of the aforementioned operations may be performed by the monitoring application server.

FIG. 1 is a contextual diagram of an example of a community monitoring system 100 for optimizing a navigation path of a drone 150.

The community monitoring system 100 may include one or more properties 101, 102, 103, one or more monitoring system control units 110a, 110b, 110c, one or more cameras 130a, 131a, 132a, 133a, 134a, 130b, 131b, 132b, 133b, 134b, 130c, 131c, 132c, 133c, 134c, a monitoring station 140, one or more drones 150, 151, 152, 153, a monitoring application server 190, a central alarm station server 192, a monitoring station server 194, a network 180, and one or more communication links 182.150

The community monitoring system 100 may use a monitoring application server 190 to obtain and analyze monitoring system data generated by each of the one or more monitoring system control units 110a, 110b, 110c. Each of the monitoring system control units 110a, 110b, 110c may be installed at a respective property 101, 102, 103. Each property 101, 102, 103 may also include one or more cameras. For example, the property 101 includes the cameras 130a, 131a, 132a, 133a, 134a, the property 102 includes the cameras 130b, 131b, 132b, 133b, 134b, and the property 103 includes the cameras 130c, 131c, 132c, 133c, 134c. Each of the cameras can be configured to capture image data such as images, videos, or a combination thereof. The cameras can broadcast the image data using one or more networks. A monitoring system control unit at a property such monitoring system control unit 110a, 110b, 110c can detect the broadcasted image data and analyze the detected image data to determine if a potential event is occurring at the property where the respective monitoring system control unit 110a, 110b, 110c is installed.

Alternatively, or in addition, a monitoring system control unit 110a, 110b, 110c can transmit the detected image data to the monitoring application server 190, one or more drones 150, 151, 152, 153, or the like. In some implementations, a monitoring system control unit 110a, 110b, 110c can transmit the detected image data to the monitoring application server 190, the one or more drones 150, 151, 152, 153, or the like in order for the monitoring application server 190, the one or more drones 150, 151, 152, 153 to analyze the image data to determine whether one or more objects depicted in the image data is indicative of a potential event. In other implementations, the monitoring system control unit 110a, 110b, 110c may only begin transmitting image data to the monitoring application server 190, one or more drones 150, 151, 152, 153, or the like after the monitoring system control unit 110 determines, based on the image data, that an potential event has occurred at the property. A potential event may include, for example, detection of a trespasser in the image data In the same manner, each property 101, 102, 103 may include a plurality of sensors or detectors such as motion sensors, contact sensors, glass-break sensors, smoke sensors, temperature sensors, water sensors, or the like. The sensors can generate and broadcast sensor data based on one or more sensed attributes of a property 101, 102, 103. A monitoring system control unit at a property such as monitoring system control unit 110a, 110b, 110c can detect the broadcasted sensor data and analyze the detected sensor data to determine if a potential event is occurring at the property where the respective monitoring system control unit 110a, 110b, 110c is installed.

Alternatively, or in addition, a monitoring system control unit 110a, 110b, 110c can transmit the detected sensor data to the monitoring application server 190, one or more drones 150, 151, 152, 153, or the like. In some implementations, a monitoring system control unit 110*a*, 110*b*, 110*c* can transmit the detected sensor data to the monitoring application server 190, the one or more drones 150, 151, 152, 153, or the like in order for the monitoring application server 190, the one or more drones 150, 151, 152, 153 to analyze the sensor data to determine whether the sensor data is indicative of a potential event. In other implementations, the monitoring system control unit 110*a*, 110*b*, 110*c* may only begin transmitting sensor data to the monitoring application server 190, one or more drones 150, 151, 152, 153, or the like after the monitoring system control unit 110 determines, based on the sensor data, that a potential event has occurred at the property.

Though the collection and analysis of image data and sensor data are discussed separately above, the present disclosure need to be so limited. In some implementations, one or more components of the community monitoring system 100 may determine that a potential event is occurring based on an analysis of both image data and sensor data.

With reference to the example of FIG. 1, a trespasser 115 may break into the property 101. The monitoring system control unit 110*a* can detect monitoring system data such as image data, sensor data, or both, that is indicative of the breaking-and-entering event. For example, the monitoring system control unit 110*a* can detect sensor data from a contact sensor indicating a door or window has opened and sensor data from one or more motion sensors indicating there one or more moving objects in the property 101 when the property's 101 local monitoring system was in the armed-away state. Alternatively, or in addition, the monitoring system control unit 110*a* can determine that there is a breaking-and-entering event based on an analysis of image data that depicts a human person in the property 101 when the property's 101 local monitoring system was in the armed-away state.

The monitoring system control unit 110*a* may transmit monitoring system data to the monitoring application server 190 that indicates that a potential event is occurring at the property 101. The monitoring system data may include image data, sensor data, or both, detected by the monitoring system control unit 110*a*. Alternatively, or in addition, the monitoring system data may include a notification indicating that a potential event was detected at the property 101.

The monitoring application server 190 can determine, based on the received monitoring system data, whether a potential event is occurring at the property 101. In some implementations, the monitoring application server 190 may perform additional analysis of image data, sensor data, or both, from the monitoring system control unity 110*a* before determining that it is likely that a potential event is occurring at the property 101. For example, the monitoring application server 190 can perform additional image analysis of received images, perform additional sensor analysis of sensor data from one or more sensors, transmit notifications to one or more legitimate occupants of the property requesting feedback (e.g., asking a legitimate occupant if the legitimate occupant is currently home at the property), or the like. Alternatively, the monitoring system control unit 190 can immediately trigger performance of one or more operations in response to the notification from the monitoring system control unit 110*a*.

In some implementations, the monitoring application server 190 can transmit one or more instructions to a monitoring station server 194 via the network 180 and one or more communication links 182 that instruct the monitoring station server 194 to deploy one or more drones 150, 151, 152, 153, 154 to the property 101 to investigate the potential event. The monitoring station server 194 can instruct a particular drone 150 to deploy from the monitoring station 140, and navigate to the property 101 to investigate the potential event. Alternatively, in some implementations, the monitoring application server 190 can transmit one or more instructions directly to a particular drone 150 via the network 180 and one or more communications links 182 that instruct the particular drone 150 to deploy from the monitoring station 140, and navigate to the property 101 to investigate the potential event.

Alternatively, or in addition to any of the aforementioned operations, the monitoring application server 190 can also notify a central alarm station server 192 of the potential event by transmitting one or more notifications via the network 180 and one or more communication links 182. The monitoring application server's 190 notification to the central alarm station server 192 can request that law enforcement agents be dispatched to the property 101. The central alarm station server 192 can determine whether or not to ask a dispatch office to deploy law enforcement agents based on an analysis of the notifications received from the monitoring application server 190.

The drone 150 may deploy from the monitoring station 140 along an initial navigation path 112 towards the property 101 to investigate a potential event at the property 101 based on the instruction received from the monitoring station server 194, the monitoring application server 190, or some other device. Alternatively, in some implementations, the drone 150 may have already been deployed to perform one or more tasks upon receipt of an instruction to navigate towards the property 101 to investigate a potential event at property 101. In such instances, the drone 150 may adjust its navigation path to a navigation path 112 towards the property 101 to investigate a potential event at the property 101.

In some implementations, the drone 150 can begin receiving a stream of data from multiple monitoring system control units 110*a*, 110*b*, 110*c* that are within a particular geographic distance of the property 101. The particular geographic distance may be predetermined to include each of one or more monitoring system control units that are installed at a respective properties that neighbor a property whose monitoring system control unit detected a potential event. For example, a monitoring system control unit may be configured to begin transmitting monitoring system data to the monitoring application server 190, the drone 150, or both, in response determining that a monitoring system control unit in a neighboring property has detected a potential event and started transmitting monitoring system data to the monitoring application server 190, the drone 150, or both.

With reference to FIG. 1, for example, a first monitoring system control unit 110*c* may determine that a neighboring monitoring system control unit 110*a* has detected a potential event based on detecting a notification (or other type of monitoring system data) broadcast by the monitoring system control unit. Alternatively, the monitoring system control unit 110*c* may determine that the monitoring system control unit 110*a* has detected a potential event based on a notification received from the monitoring application server 190. For example, in some implementations, in response to the monitoring system control unit 110*a* notifying the monitoring application server 190 of a potential event, the monitoring application server 190 may transmit instructions to the neighboring monitoring system control units 110*b*, 110*c* that instructs the neighboring monitoring system control units 110*b*, 110*c* to begin transmitting monitoring system data such as image data, sensor data, or both, to the drone 150, the monitoring application server 190, or both.

Alternatively, in some implementations, the particular geographic distance may be dynamically determined. For example, a monitoring application server 190 may determine, based on an analysis of monitoring system data from the monitoring system 110a that a trespasser 115 fled in a particular direction. In response, the monitoring application server 190 can instruct each of the one or monitoring system control units that are installed at respective properties that exist along the path where the trespasser 115 fled to begin transmitting monitoring system data such image data, sensor data, or the like to the monitoring application server 190, the drone 150, or the like.

In some implementations, the aspects of the particular geographic distance may be calculated using both methods—i.e., predetermined distance and dynamically determined distance. For example, upon the initial detection of an event by a first monitoring system control unit is detected, each of the neighboring monitoring system control units may be being transmitting monitoring system data to the monitoring application server 190, the drone 150, or both. Then, as the intruder continues to move throughout the community, the geographic distance may be dynamically determines so that only monitoring control units installed in properties associated with the trespasser's travel path transmit monitoring system data to the monitoring application server 190, the drone 150, or both.

In some implementations, the drone 150 may dynamically generate a navigational model based on the received monitoring system data. For example, the drone 150 may dynamically generate the navigational model as the drone 150 navigates along the initial navigation path 112 towards the property 101. Alternatively, the drone 150 may generate the initial navigational model prior to deployment of the drone 150. The navigational model may include any spatial representation of geographic features that represents at least a portion of a geographic region that the drone can use to navigate to a target location. The target location may include a property address, a GPS coordinate, a location of a surveillance objective determined based on image analysis of image data captured from local monitoring systems within a predetermined distance of a detected event, or the like.

The navigational model may provide a geographic representation of the location of one or more structures in the community that are within a particular geographic distance of the property 101, the location of vehicles within a particular geographic distance of the property 101, portions of the area surrounding property 101 of which images can be captured by a camera installed at the property 101 (or by a camera installed at a neighboring property 102, 103), portion of the area surrounding the property 101 of which images cannot be captured by a camera installed at the property 101 (or by a camera installed at a neighboring property 102, 103), or the like. The navigational model may include a three-dimensional navigational model. The drone 150 may perform the aforementioned analysis for each property 101, 102, 103 that is in the vicinity of the property that initially detected the potential event.

In some implementations, the navigational model may generated to include data identifying a travel path of a trespasser 115 as the trespasser 115 flees the property 101, a projected travel path of the trespasser 115 that predicts likely travel path the trespasser 115 is likely to use based on sensor data indicative of the trespasser's 115 current location (or movements), or both. For example, the drone 150 may analyze a series of time stamped image data (e.g., still images, video images, or both) from one or more monitoring system control units 110a, 110b, 110c and determine the relative movements of the trespasser 115 from picture-to-picture. The drone 150 can plot a travel path followed by the trespasser 115 based on the relative movements observed from picture-to-picture.

The drone 150 can analyze the navigational model to identify one or more surveillance objectives that may need to be investigated. Surveillance objectives may include obtaining image data of a trespasser's 115 face, obtaining image data of one or more vehicles 120, 122, 124 in the vicinity (e.g., within a predetermined geographic distance or within a determined geographic distance) of a detected event, tracking a fleeing trespasser 115 until law enforcement apprehends the trespasser 115, or the like. Surveillance objectives may be identify and prioritized based on the generated navigational model. For example, in some implementations, obtaining image data of a trespasser's face may be assigned the highest priority. In such implementations, obtaining image data of a vehicle that may have been used by the trespasser 115, obtaining image data of a license plate of a vehicle that may have been used by the trespasser 115, or the like may be given a secondary priority. Similarly, in such implementations, tracking a fleeing trespasser 115 may be given a tertiary priority. Prioritizing surveillance objectives in the aforementioned manner may be beneficial because, for example, the image data of the trespasser's 115 face and vehicle may be used as evidence to connect the trespasser 115 to the break-in at property 110a.

However, the present disclosure need not be so limited. For example, in other implementations, the same surveillance objectives may be prioritized by the drone 150 in a different manner. For example, in some implementations, obtaining images of one or more vehicle's that may be associated with the trespasser 115 may be given the highest priority. For example, the drone 150 may determine, based on the trespasser's travel path and the generated navigational model, that the trespasser 115 will run into a camera's line of sight that can capture the trespasser's 115 face. In such a scenario, the drone 150 may prioritize obtaining image data of one or more vehicles within a vicinity of a detected event that may be associated with a trespasser 115 over one or more other security objectives such as capturing an image of the trespasser's 115 face.

Identifying one or more surveillance objectives may include the drone 150 generating a ranked list of one or more surveillance objectives. The drone 150 may be configured to determine whether one or more surveillance objectives are no longer necessary because monitoring system data already obtained information related to the surveillance objective. For example, the drone 150 can process image data to determine whether one or more cameras installed at the property 101, the property 102, or the property 103 has captured image data of the face of the trespasser 115. If the image data of the face of the trespasser 115 has been detected, the drone 150 can reduce the priority of the surveillance objective of obtaining one or more images of the trespasser's 115 face. Alternatively, the drone 150 can disregard (e.g., ignore) a surveillance objective that has already been completed by one or more components of local monitoring systems installed at the properties 101, 102, 103. For example, in response to determining that image data of the trespasser's 115 face has been obtained, the drone 150 can prioritize obtaining image data depicting one or more vehicles such as vehicle 124 that may be associated with a trespasser 115.

Alternatively, or in addition, the drone 150 may have analyzed image data from one or more cameras 130a, 134b, 130c that depicted a person getting out of a particular vehicle 124 (i) prior to a detected event, and (ii) within a predetermined distance of the detected event. In such instances, the drone 150 may prioritize obtaining image data of the particular vehicle 124 over one or more other surveillance objectives such as obtaining image data of a fleeing trespasser 115. In other words, while there may be an initial ranking of surveillance objectives such as (i) obtain image data of trespasser, (ii) obtain image data of potential vehicles that may potentially belong to (or have been used by) the trespasser 115, and (iii) tracking the trespasser 115, the drone 150 is capable of dynamically ranking (or re-ranking) surveillance objectives based on monitoring system data received from one or more monitoring system control units 110a, 110b, 110c, the monitoring application server 190, the central alarm station server 192, one or more cameras, or a combination thereof.

In some implementations, even more granular ranking of surveillance objectives may be performed. For example, in some implementations, the drone 150 may prioritize obtaining one or more particular types of vehicles over other particular types of vehicles. For example, the drone 150 may be equipped with a thermal camera and prioritize obtaining image data of a vehicle in the vicinity of a detected event that is warm. Alternatively, or in addition, the drone 150 may priority obtaining image data of a vehicle that is within a vicinity of a detected event and running. Such vehicles may have a tendency to be associated with a trespasser 115.

The drone 150 may identify the location of each of the one or more surveillance objectives. For example, the drone 150 can analyze monitoring system data received from one or more monitoring system control units 110a, 110b, 110c, and determine the likely location of one or more surveillance objectives. For moving surveillance objectives such as one or more trespassers 115 (or moving vehicles), the drone 150 may analyze a series of time stamped image data (e.g., still images, video images, or both) from one or more monitoring system control units 110a, 110b, 110c and determine the relative movements of the one or more trespassers 115 from picture-to-picture. For unmoving surveillance objectives, the drone 150 may determine their respective locations based on an analysis of image data from one or more monitoring system control units 110a, 110b, 110c.

The drone 150 may determine an adjusted navigation path based on the generated navigational model. For example, instead of continuing along the initial navigation path 112, the drone 150 may select an optimized navigation path 112a, 112b based on the one or more surveillance objectives that need to be performed. The optimized navigation paths 112a, 112b allow the drone 150 to investigate relevant surveillance objectives instead of merely navigating directly to the address of property 101 along navigation path 112.

For example, with reference to scenario A of FIG. 1, the drone 150 may determine, based on a navigational model generated using monitoring system data from the monitoring system control units 110a, 110b, 110c transmitted as a result of a break-in to property 101 by trespasser 115, that the trespasser 115 is fleeing on a path 113. In some implementations, the monitoring system data may include camera data that describes a camera configuration of each camera of the one or more properties that are monitored by the monitoring system control units 110a, 110b, 110c. Alternatively, the drone 150 may already store such camera data locally or access the camera data from a remote source such as one of the local monitoring units 110a, 110b, 110c or the a monitoring application server 190. For example, a property occupant may be required to authorize sharing of the properties camera configuration data when subscribing to a monitoring service offered by the monitoring system of FIG. 1

The navigational model may be generated using the camera data and other geographic information the drone has obtained related to the geographic area surrounding property 101. The other geographic data may be obtained from previously generated maps describing a geographic area associated with the property 101 (and its vicinity), image data from cameras installed at the property 101 (and one or more neighboring properties), or the like. Using the navigational model based on the camera data can determine portions of the property 101 that can be viewed by a camera and portions of the property 101 that are blind spots (e.g., not within field-of-view of one or more cameras).

The drone 150 can determine based on the generated navigational model that the path 113 passes through a blind spot in the property's 101 cameras between the line-of-sight of cameras 133a and 134a. Alternatively, or in addition, the drone 150 can analyze image data from the monitoring system control units 110a, 110b, 110c and determine that none of the obtained image data depicts the face of the trespasser 115. Based on determining that the trespasser 115 traveled through a blind spot, that none of the image data depicts the face of the trespasser 115, or both, the drone 150 determines that the drone 150 needs to obtain image data of the trespasser's 115 face. Accordingly, the drone 150 can assign the higher priority to the surveillance objective of obtaining image data of the trespasser's 115 face than the priority associated with other surveillance objectives such as obtaining image data of a one or more vehicles that may be associated with a trespasser 115 (e.g., one or more vehicles that are within a vicinity of an event and warm, one or more vehicles that are within a vicinity of an event and running, or the like).

Based on determining that an image of the face of the trespasser 115 has not yet been obtained, the drone 150 may adjust the drone's 150 navigation path from an initial navigation path 112 that would take the drone 150 to the address of the property 101 to an optimized navigation path 112a that can position the drone in a position "X" that can enable the drone 150 to obtain image data of the trespasser's 115 face using the drone's 150 camera 150a. In some implementations, the drone 150 may also perform one or more operations to contain or incapacitate the trespasser 115 such as using a shocking device 150b to shock the trespasser 115. The optimized navigation path 112a enables the community monitoring system 110 to capture image data of the trespasser's 115 even though the trespasser 115 is otherwise fleeing along a path 113 through a blind spot in each of the cameras 130a, 131a, 132a, 133a, 134a, 130b, 131b, 132b, 133b, 134b, 130c, 131c, 132c, 133c, 134c of the community of properties 101, 102, 103.

However, though the navigation path 112a may be an optimized path based on a particular set of monitoring system data (e.g., image data, sensor data, and the like) received from the monitoring system control units 110a, 110b, 110c of properties 101, 102, 103, other optimized path may exist for the same community based on different sets of monitoring system data.

For example, with reference to scenario B of FIG. 1, the drone 150 may determine, based on a navigational model generated using monitoring system data from the monitoring system control units 110a, 110b, 110c transmitted as a result of a break-in to property 101 by trespasser 115 that the trespasser 115 is fleeing on a path 114. The drone 150 can determine based on the generated navigational model that the path 114 results in the trespasser 115 running face-first into the line-of-sight of at least camera 134c. Alternatively, or in addition, the drone 150 can analyze image data from one or more of the monitoring system control units 110a, 110b, 110c and determine that one or more of the cameras 133a, 132a, 131a, 134c obtained image data that depicts the face of the trespasser 115. Based on determining that image data of the trespasser's 115 face is likely to be obtained based on the trespasser's path 114, that image data of the trespasser's 115 face has already been obtained, or both, the drone 150 determines that the drone 150 needs to obtain image data of one or more vehicle's that may be associated with the trespasser 115. Accordingly, the drone 150 can assign the higher priority to the surveillance objective of obtaining image data of one or more vehicles that may be associated with a trespasser than the priority associated with one or more other surveillance objectives such as obtaining image data of the trespasser's 115 face.

Based on determining that an image of the face of the trespasser 115 has been obtained, the drone 150 may adjust the drone's 150 navigation path from an initial navigation path 112 that would take the drone 150 to the address of the property 101 to an optimized navigation path 112b that can position the drone in a position "Y" that can enable the drone 150 to obtain image data of one or more vehicles such as vehicle 124 that may be associated with the trespasser 115. For example, the drone 150 may determine that the vehicle 124 is associated with the trespasser because the vehicle is within a vicinity of the monitoring system control unit 110a that detected the event and the vehicle 124 is warm. The drone 150 can navigate to position "Y," and use the drone's camera 150a to capture image data depicting the vehicle 124, the license plate of vehicle 124, or both. Dynamically adjusting the drone's 150 navigation path from the initial path 112 to an optimized path 112b while en route may enable the drone 150 to position itself to capture image data of the vehicle 124 before trespasser 115 can get to the vehicle 124 and depart the scene. Moreover, the optimized navigation path 112b enables the community monitoring system 100 to capture image data of vehicle 124 that may be associated with the trespasser 115 even though the trespasser 115 may have parked the vehicle 124 in a blind spot of each of the cameras 130a, 131a, 132a, 133a, 134a, 130b, 131b, 132b, 133b, 134b, 130c, 131c, 132c, 133c, 134c of the community of properties 101, 102, 103.

In some implementations, there may be a plurality of vehicles 120, 122, 124 that are parked in the vicinity of the property 101 where the monitoring system control unit 110a detected the event. In such instances, the drone 150 may need to determine which vehicle of the plurality of vehicles 120, 122, 124 may be associated with the trespasser 115. In some implementations, the drone 150 may use a drone-mounted thermal camera to capture thermal images of the plurality of vehicles 120, 122, 124. The drone 150 may determine, based on the captured thermal images, which vehicle of the plurality of vehicles 120, 122, 124 may be associated with the trespasser 115. For example, the drone 150 may determine that a particular vehicle 124 of the plurality of vehicles 120, 122, 124 is (i) running, based on thermal images (or other images that may depict, for example vehicle exhaust), and (ii) within a predetermined distance of the monitoring system control unit 110a, the property 101, or both. In such instances, the drone 150 may determine that the particular vehicle 124 may be associated with the trespasser 115. In such instances, the drone 150 may prioritize capturing image data of the particular vehicle 124 when the drone 150 arrives at position "Y."

Alternatively, or in addition, the drone 150 may analyze image data depicting one or more vehicles of the plurality of vehicles 120, 122 that are within the line of sight of the cameras 130a, 131a, 132a, 133a, 134a, 130b, 131b, 132b, 133b, 134b, 130c, 131c, 132c, 133c, 134c of the community of properties 101, 102, 103 while the drone 150 is en route. For example, the drone 150 may detect license plate numbers in the image data, cross-reference the license plate numbers with one or more databases, and determine whether the vehicle is associated with a legitimate occupant of one or more properties in the community of properties 101, 102, 103. Once the drone 150 arrives at position "Y", the drone 150 may prioritize capturing image data of the one or more vehicles that the drone 150 could not associate with a legitimate occupant of one or more of the properties 101, 102, 103 based on the analysis of detected license plates. Alternatively, or in addition, the drone 150 can prioritize capturing image data depicting the vehicles 124 that are outside the line of sight of the cameras 130a, 131a, 132a, 133a, 134a, 130b, 131b, 132b, 133b, 134b, 130c, 131c, 132c, 133c, 134c of the community of properties 101, 102, 103 when the drone 150 arrives at the position "Y."

The aforementioned description of FIG. 1 describes the community monitoring system 100 in a way that has the drone 150 determining an optimized navigation path 112a or 112b after deploying from a monitoring station 140. However, the present disclosure need not be so limited. Instead, the drone 150 may calculate an optimized navigation path 112a or 112b before the drone 150 deploys from the monitoring station 140.

In addition, the description of FIG. 1 describes the drone 150 as receiving monitoring system data from one or more monitoring system control units 110a, 110b, 110c and determining an optimized navigation path. However, the present disclosure need not be so limited. For example, in some implementations, a monitoring application server 190 may perform one or more of the operations described as being performed by the drone 150 such as obtain monitoring system data, generate a navigational model based on the obtained monitoring system data, one or more surveillance objectives, identify a location associated with each of one or more surveillance objectives, and determine an optimized navigation path. Then, once the monitoring application server 190 has determined the optimized navigation path, the monitoring application server 190 can provide data describing the optimized navigation path to the drone 150 via the network 180 and one or more communication links 182. The drone 150 can then adjust its current navigation path to follow the optimized navigation path determined by the monitoring application server 190.

In some implementations, the image data obtained and analyzed by the monitoring application server 190 (or the drone) may include images or video generated by one or more of the respective cameras 130a, 130a, 130a, 130a, 130b, 130b, 130b, 130b, 130c, 130c, 130c, 130c received. However, the present disclosure need not be so limited. In other implementations, the image data may include data representing a determination made by one or more of the respective cameras 130a, 130a, 130a, 130a, 130b, 130b, 130b, 130b, 130c, 130c, 130c, 130c based on the respective camera's analysis of a generated image or video. For example, one or more of the cameras such as camera 134c may store an image model that represents objects that can be detected by the camera such as one or more vehicle types, images of human objects, or the like. The image model may include, for example, a set of features describing an image (or video) of an object, a machine learning model that has been trained to detect objects in an image (or video), or even one or more stored images (or videos) of objects. By way of example, a camera such as camera 134c may store an image model representing a human object. The camera 134c may generate an image (or video), obtain a set of features (e.g., isolated sets of pixels representing points of an image, curves of an image, continuous regions of an image, or the like), and determine a level of similarity between the obtained set of features and the stored model. If the camera 134c determines that a similarity level between the obtained set of features and the stored image model representing a vehicle satisfies a predetermined threshold, the camera 134c may determine that an object represented by the set of features has been detected. In some implementations, the camera 134c may store a model that was downloaded to (or uploaded to) the camera 134c. The camera 134c can then broadcast image data representing a determination, by the camera 134c, that indicates that the camera 134c detected the object represented by the model. This image data representing a determination of the camera 134c can be provided to the monitoring application server 190 or the drone 150 and the monitoring application server 190 or the drone 150 can process the received image data to determine whether an image captured by the camera 134c depicts a particular object. If the monitoring application server 190 or the drone 150 determines that the image data indicates that an image (or video) captured by the camera 134c depicts a particular object, the monitoring application server 190 or the drone 150 can determine that the particular object is present based on analysis of the image data representing the camera's 134 determination.

FIG. 2 is a flowchart of an example of a process 200 for optimizing a navigation path of a drone. Generally, the process 200 may include receiving an instruction to deploy based on a detected event (210), obtaining monitoring system data from local monitoring systems associated with the event (220), generating a navigational model based on the obtained monitoring system data (230), identifying one or more surveillance objectives (240), identifying a location associated with each of the one or more surveillance objectives (250), and determining an optimized navigation path to the one or more locations (260). For convenience, the process 200 will be described as being performed by a drone such as a drone 150 described with reference to FIGS. 1 and 2.

In more detail, a drone may being performance of the method 200 by receiving 210 an instruction to deploy based on a detected event. For example, the drone may receive an instruction to deploy to an initial location in a community. The drone may navigate to the initial location (e.g., a first property) in the community using an initial navigation path.

The drone can obtain 220 monitoring system data from local monitoring systems associated with the event. Monitoring system data may include, for example, image data, sensor data, or the like. In some implementations, the monitoring system data may be obtained from one or more respective monitoring system control units that are each installed at respective properties in a community. For example, the drone is configured to receive image data from a first monitoring system control unit installed at the first property and a second monitoring system control unit installed at a second property.

The drone can generate 230 a navigational model based on the obtained monitoring system data. For example, the drone may dynamically generate the navigational model as the drone navigates along the initial navigation path towards the first property. The navigational model may provide a geographic representation of the location of one or more structures in the community that are within a particular geographic distance of the first property, the location of vehicles within a particular geographic distance of the first property, portions of the area surrounding the first property of which images can be captured by a camera installed at the first property (or by a camera installed at a second property), a portion of the area surrounding the property of which images cannot be captured by a camera installed at the first property (or by a camera installed at a second property), or the like. The navigational model may include a three-dimensional navigational model. The drone may perform the aforementioned analysis for each of one or more second properties that is in the vicinity of the first property that initially detected the potential event.

The drone can identify 240 one or more surveillance objectives. Identifying one or more surveillance objectives may include the drone generating a ranked list of one or more surveillance objectives. The drone may be configured to determine whether one or more surveillance objectives are no longer necessary because monitoring system data already obtained information related to the surveillance objective. For example, the drone can process image data to determine whether one or more cameras installed at the first property or one or more second properties has captured image data of the face of the trespasser.

The drone can identify 250 a location associated with each of the one or more surveillance objectives. For example, the drone can analyze monitoring system data received from the first monitoring system control unit installed at the first property and monitoring system data received from the second monitoring system control unit installed at the second property, and determine the likely location of the one or more surveillance objectives. The monitoring system data my include image data, sensor data, or a combination thereof.

For moving surveillance objectives such as one or more trespassers (or moving vehicles), the drone may analyze a series of time stamped image data (e.g., still images, video images, or both) from the first monitoring system control unit installed at the first property, the second monitoring system control unit installed at the second property, one or more other monitoring system control units, or a combination thereof and determine the relative movements of the one or more trespassers from image-to-image. For unmoving surveillance objectives, the drone may determine their respective locations based on an analysis of image data from the first monitoring system control unit installed at the first property, the second monitoring system control unit installed at the second property, one or more other monitoring system control units, or a combination thereof.

The drone can determine 260 determining an optimized navigation path to the one or more locations (260). For example, the drone can adjust the drone's initial navigation path based on the generated navigational model so that the drone can navigate directly towards a location associated with a surveillance object.

FIG. 3 is a flowchart of another example of a process 300 for optimizing a navigation path of a drone. Generally, the process 300 may include obtaining monitoring system data from local monitoring systems associated with an event (310), generating a navigational model based on the obtained monitoring system data (320), identify one or more surveillance objectives (330), identify a location associated each of the one or more surveillance objectives (340), determine an optimized navigation path to the one or more locations (350), and providing data describing the optimized navigation path to a drone (360). For convenience, the process 300 will be described as being performed by a monitoring unit such as a monitoring application server 190 described with reference to FIGS. 1 and 2.

The monitoring unit can begin performance of the process 300 by obtaining 310 monitoring system data from local monitoring systems associated with an event. Monitoring system data may include, for example, image data, sensor data, or the like. In some implementations, the monitoring system data may be obtained from one or more respective monitoring system control units that are each installed at respective properties in a community. For example, the monitoring unit is configured to receive image data from a first monitoring system control unit installed at the first property and a second monitoring system control unit installed at a second property.

The monitoring unit can generate 320 a navigational model based on the obtained monitoring system data. For example, the monitoring unit may dynamically generate the navigational model as a deployed drone navigates along the initial navigation path towards the first property. Alternatively, the monitoring unit can generate the navigational model prior to instructing the drone to deploy.

The navigational model may provide a geographic representation of the location of one or more structures in the community that are within a particular geographic distance of the first property, the location of vehicles within a particular geographic distance of the first property, portions of the area surrounding the first property of which images can be captured by a camera installed at the first property (or by a camera installed at a second property), a portion of the area surrounding the property of which images cannot be captured by a camera installed at the first property (or by a camera installed at a second property), or the like. The navigational model may include a three-dimensional navigational model. The monitoring unit may perform the aforementioned analysis for each of one or more second properties that is in the vicinity of the first property that initially detected the potential event.

The monitoring unit can identify 330 one or more surveillance objectives. Identifying one or more surveillance objectives may include the monitoring unit generating a ranked list of one or more surveillance objectives. The monitoring unit may be configured to determine whether one or more surveillance objectives are no longer necessary because monitoring system data already obtained information related to the surveillance objective. For example, the monitoring unit can process image data to determine whether one or more cameras installed at the first property or one or more second properties has captured image data of the face of the trespasser.

The monitoring unit can identify 340 a location associated each of the one or more surveillance objectives. For example, the monitoring unit can analyze monitoring system data received from the first monitoring system control unit installed at the first property and monitoring system data received from the second monitoring system control unit installed at the second property, and determine the likely location of the one or more surveillance objectives. The monitoring system data my include image data, sensor data, or a combination thereof.

For moving surveillance objectives such as one or more trespassers (or moving vehicles), the monitoring unit may analyze a series of time stamped image data (e.g., still images, video images, or both) from the first monitoring system control unit installed at the first property, the second monitoring system control unit installed at the second property, one or more other monitoring system control units, or a combination thereof and determine the relative movements of the one or more trespassers from image-to-image. For unmoving surveillance objectives, the monitoring unit may determine their respective locations based on an analysis of image data from the first monitoring system control unit installed at the first property, the second monitoring system control unit installed at the second property, one or more other monitoring system control units, or a combination thereof.

The monitoring unit can 350 determine an optimized navigation path to the one or more locations. For example, the monitoring unit generate an adjusted navigational path based on the generated navigational model that the drone can follow to navigate directly towards a location associated with a surveillance object.

The monitoring unit can provide 360 data describing the optimized navigation path to a drone. For example, the monitoring unit can transmit data describing the optimized navigation path to the drone using one or more networks. The drone can use the data describing the optimized navigation path to adjust the drone's current navigation path.

Figure 4:
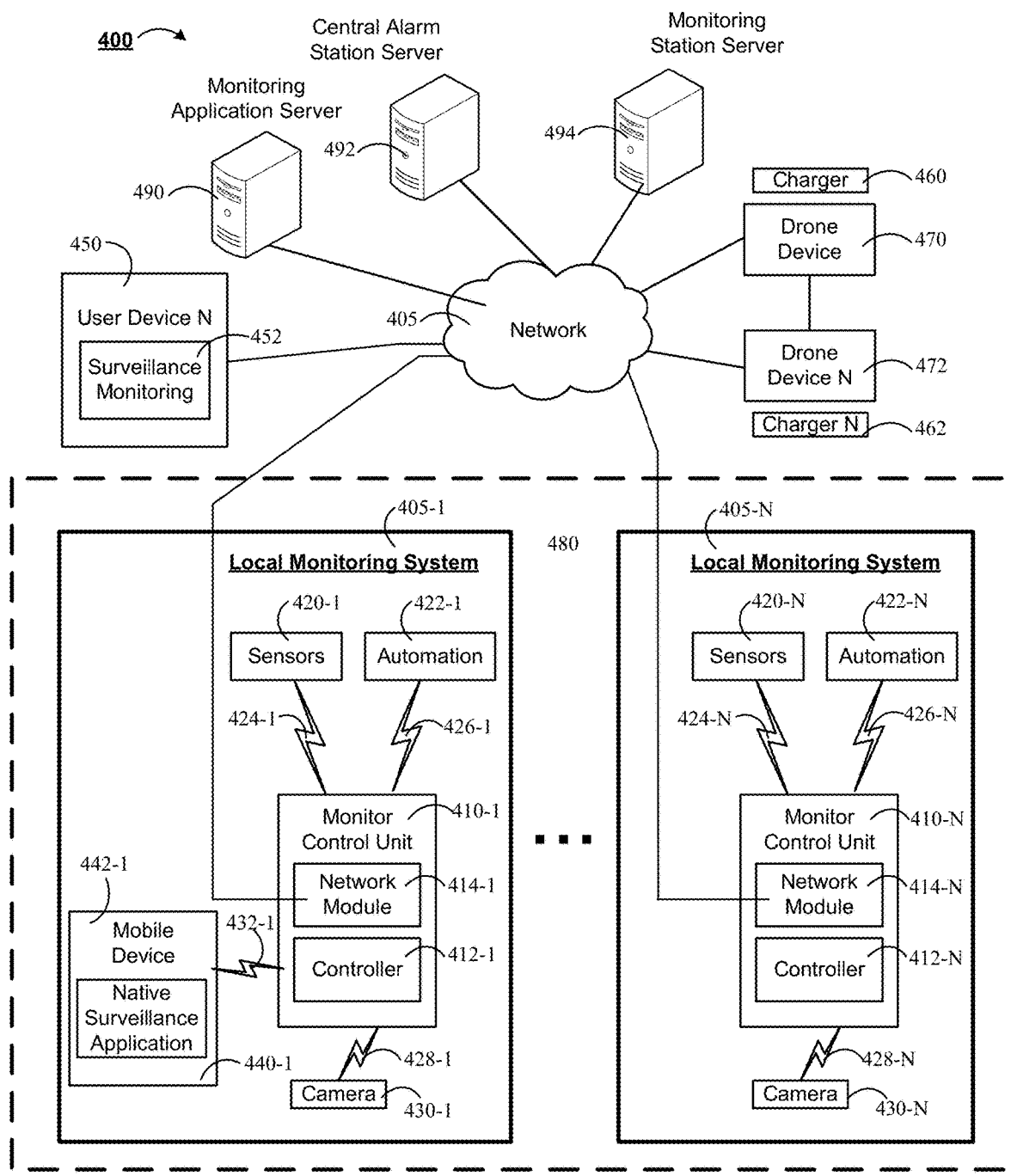
FIG. 4 is a block diagram of components that can be used to implement a community monitoring system for optimizing a path of a drone.

FIG. 4 is a block diagram of components that can be used to implement a community monitoring system 400 for optimizing a path of a drone.

The electronic system 400 includes a network 405, a monitor control unit 410-1, one or more user devices 440-1, 450, one or more drone devices 470, 472 monitoring application server 490, a central alarm station server 492, and a monitoring station server 494.

The network 405 is configured to enable exchange of electronic communications between devices connected to the network 405. For example, the network 405 may be configured to enable exchange of electronic communications between the monitoring system control unit 410-1, the one or more user devices 440-1, 450, the monitoring application server 490, the central alarm station server 492, and the monitoring station server 470. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The monitoring system control unit 410-1 includes a controller 412-1 and a network module 414-1. The controller 412-1 is configured to control a monitoring system (e.g., a home alarm or security system) that includes the monitoring system control unit 410-1. In some implementations, the controller 412-1 may include a processor or other control circuitry configured to execute instructions of a program that controls operation of an alarm system. In these examples, the controller 412-1 may be configured to receive input from sensors, detectors, or other devices included in the alarm system and control operations of devices included in the alarm system or other household devices (e.g., a thermostat, an appliance, lights, etc.). For example, the controller 412-1 may be configured to control operation of the network module 414-1 included in the monitoring system control unit 410-1.

The network module 414-1 is a communication device configured to exchange communications over the network 405. The network module 414-1 may be a wireless communication module configured to exchange wireless communications over the network 405. For example, the network module 414-1 may be a wireless communication device configured to exchange communications over a wireless data channel and a wireless voice channel. In this example, the network module 414-1 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414-1 also may be a wired communication module configured to exchange communications over the network 405 using a wired connection. For instance, the network module 414-1 may be a modem, a network interface card, or another type of network interface device. The network module 414-1 may be an Ethernet network card configured to enable the monitoring system control unit 410-1 to communicate over a local area network and/or the Internet. The network module 414-1 also may be a voiceband modem configured to enable the alarm panel to communicate over the telephone lines of Plain Old Telephone Systems (POTS).

The monitoring system that includes the monitoring system control unit 410-1 includes one or more sensors or detectors. For example, the monitoring system may include multiple sensors 420-1. The sensors 420-1 may include a contact sensor, a motion sensor, a glass break sensor, or any other type of sensor included in an alarm system or security system. The sensors 420-1 also may include an environmental sensor, such as a temperature sensor, a water sensor, a rain sensor, a wind sensor, a light sensor, a smoke detector, a carbon monoxide detector, an air quality sensor, etc. The sensors 420-1 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some implementations, the sensors 420-1 may include a radio-frequency identification (RFID) sensor that identifies a particular article that includes a pre-assigned RFID tag.

The monitoring system control unit 410-1 communicates with the module 422-1 and the camera 430-1 to perform surveillance or monitoring. The module 422-1 is connected to one or more devices that enable home automation control. For instance, the module 422-1 may be connected to one or more lighting systems and may be configured to control operation of the one or more lighting systems. Also, the module 422-1 may be connected to one or more electronic locks at the property and may be configured to control operation of the one or more electronic locks (e.g., control Z-Wave locks using wireless communications in the Z-Wave protocol). Further, the module 422-1 may be connected to one or more appliances at the property and may be configured to control operation of the one or more appliances. The module 422-1 may include multiple modules that are each specific to the type of device being controlled in an automated manner. The module 422-1 may control the one or more devices based on commands received from the monitoring system control unit 410-1. For instance, the module 422-1 may cause a lighting system to illuminate an area to provide a better image of the area when captured by a camera 430-1.

The camera 430-1 may be a video/photographic camera or other type of optical sensing device configured to capture images. For instance, the camera 430-1 may be configured to capture images of an area within a building monitored by the monitoring system control unit 410-1. The camera 430-1 may be configured to capture single, static images of the area and also video images of the area in which multiple images of the area are captured at a relatively high frequency (e.g., thirty images per second). The camera 430-1 may be controlled based on commands received from the monitoring system control unit 410-1.

The camera 430-1 may be triggered by several different types of techniques. For instance, a Passive Infra Red (PIR) motion sensor may be built into the camera 430-1 and used to trigger the camera 430-1 to capture one or more images when motion is detected. The camera 430-1 also may include a microwave motion sensor built into the camera and used to trigger the camera 430-1 to capture one or more images when motion is detected. The camera 430-1 may have a "normally open" or "normally closed" digital input that can trigger capture of one or more images when external sensors (e.g., the sensors 420-1, PIR, door/window, etc.) detect motion or other events. In some implementations, the camera 430-1 receives a command to capture an image when external devices detect motion or another potential alarm event. The camera 430-1 may receive the command from the controller 412-1 or directly from one of the sensors 420-1.

In some implementations, the camera 430-1 triggers integrated or external illuminators (e.g., Infra Red, Z-wave controlled "white" lights, lights controlled by the module 422-1, etc.) to improve image quality when the scene is dark. An integrated or separate light sensor may be used to determine if illumination is desired and may result in increased image quality.

The camera 430-1 may be programmed with any combination of time/day schedules, system "arming state", or other variables to determine whether images should be captured or not when triggers occur. The camera 430-1 may enter a low-power mode when not capturing images. In this case, the camera 430-1 may wake periodically to check for inbound messages from the controller 412-1. The camera 430-1 may be powered by internal, replaceable batteries if located remotely from the monitoring control unit 410-1. The camera 430-1 may employ a small solar cell to recharge the battery when light is available. Alternatively, the camera 430-1 may be powered by the controller's 412-1 power supply if the camera 430-1 is co-located with the controller 412-1.

In some implementations, the camera 430-1 communicates directly with the monitoring application server 490 over the Internet. In these implementations, image data captured by the camera 430-1 does not pass through the monitoring system control unit 410-1 and the camera 430-1 receives commands related to operation from the monitoring application server 490.

The system 400 further includes one or more drone devices 470 and 472. The drone devices 470 and 472 may be unmanned devices that are capable of movement. For example, the drone devices 470 and 472 may be capable of moving throughout a geographic region (e.g., a community, a neighborhood, a town, a city, or the like) based on automated control technology and/or user input control provided by either the user or by application server 490. In such an example, the drone devices 470 and 472 may be able to fly, roll, walk, or otherwise move about the geographic region. The drone devices 470 and 472 may include helicopter type devices (e.g., quad copters), rolling helicopter type devices (e.g., roller copter devices that can fly and also roll along the grounds, walls, or ceiling), land vehicle type devices (e.g., automated cars that drive around a property), and plane type devices (e.g., unmanned aircraft). In some instances, the drone devices 470 and 472 may be drone devices that are intended for other purposes and merely associated with the monitoring system 400 for use in appropriate circumstances. For instance, a security drone may be associated with the monitoring system 400 as one of the drone devices 470 and 472 and may be controlled to take action responsive to monitoring system events.

The drone devices 472 may be housed at a monitoring station. The monitoring station may include one or more charging stations 460, 462 and be configured to house a plurality of drone devices 470, 472. In some implementations, the monitoring station may include tens of drones, hundreds of drones, thousands of drones, or the like. The number of drones housed by a monitoring station may be based on the geographic region that the monitoring station is designed to service. A monitoring station server 494 may be associated with each monitoring station, and be configured to receive instructions to deploy drone devices 470, 472 to one or more locations of a geographic region. For example, the monitoring station server 494 can receive a request to deploy one or more drone devices from a monitoring system control unit 410-1, a user device 442-1, 450, a monitoring application server 490, a central alarm station server 492, or the like and instruct the one or more drone devices 470, 472 to deploy based on the received instructions. In some implementations, the monitoring station server 494 may monitor and screen requests to deploy one or more drone devices 470, 472. In other implementations, a monitoring system control unit 410-1, a user device 442-1, 450, a monitoring application server 490, a central alarm station server 492, or the like can directly instruct one or more drone devices 470, 472 to deploy without communicating a monitoring station server 494.

In some implementations, the drone devices 470 and 472 automatically navigate to a location of a property within a geographic region (e.g., a community, a neighborhood, a town, a city, or the like) in response to receiving an alarm signal from the monitoring application server 490. In these examples, the drone devices 470 and 472 include sensors and control processors that guide movement of the drone devices 470 and 472 to the location of the property. For instance, the drone devices 470 and 472 may navigate to the location using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about the location. The drone devices 470 and 472 may include control processors that process output from the various sensors and control the drone devices 470 and 472 to move along a path that reaches the desired destination and avoids obstacles. In this regard, the control processors detect obstructions and guide movement of the drone devices 470 and 472 in a manner that avoids the obstructions.

In some implementations, the drone devices 470 and 472 may include data capture and recording devices. In these examples, the drone devices 470 and 472 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property location.

In some implementations, the drone devices 470 and 472 may include output devices. In these implementations, the drone devices 470 and 472 may include one or more displays, one or more speakers, one or more projectors, and/or any type of output devices that allow the drone devices 470 and 472 to communicate information to a nearby user. The one or more projectors may include projectors that project a two-dimensional image onto a surface (e.g., wall, floor, or ceiling) and/or holographic projectors that project three-dimensional holograms into a nearby space.

The drone devices 470 and 472 also may include a communication module that enables the drone devices 470 and 472 to communicate with the monitoring application server 490, the central station server 492, the monitoring station server 494, the monitoring system control unit 410-1, other drone devices, and/or other devices. The communication module may be a wireless communication module that allows the drone devices 470 and 472 to communicate wirelessly. For instance, the communication module may be a Wi-Fi module that enables the drone devices 470 and 472 to communicate over a local wireless network at the property. The communication module further may be a 900 MHz wireless communication module that enables the drone devices 470 and 472 to communicate directly with the monitoring application server 490. Other types of short-range wireless communication protocols, such as Bluetooth, Bluetooth LE, Z-Wave, ZigBee, etc., may be used to allow the drone devices 470 and 472 to communicate with other devices in the property.

The drone devices 470 and 472 further may include processor and storage capabilities. The drone devices 470 and 472 may include any suitable processing devices that enable the drone devices 470 and 472 to operate applications and perform the actions described throughout this disclosure. In addition, the drone devices 470 and 472 may include solid state electronic storage that enables the drone devices 470 and 472 to store applications, configuration data, collected sensor data, and/or any other type of information available to the drone devices 470 and 472.

The drone devices 470 and 472 are associated with one or more charging stations 460 and 462. The charging stations 460 and 462 may be centrally located at predefined bases or reference locations near a neighborhood that includes multiple properties. For example, in some instances, the one or more charging stations 460 and 462 may be located on a central monitoring station where the monitoring station server 494 may be located. In other examples, the one or more charging stations 460 and 462 may be located in a monitoring station that is in a different location than the monitoring station server 494. In some implementations, the charging stations 460 and 462 may be mobile, deployable to a particular location, or the like. For instance, if drone devices 470 and 472 are deployed to a particular location, one or more charging stations 460 and 462 may be deployed to the same location. The deployed charging stations 460 and 462 can be powered from the electrical grid, be solar powered, attached to propane gasoline hookups, attached to natural gas hookups, or the like.

The drone devices 470 and 472 may be configured to navigate to the charging stations 460 and 462 after completion of tasks needed to be performed for the monitoring system 400. For instance, after completion of a monitoring operation at a particular property location, or upon instruction by the monitoring application server 490, the drone devices 470 and 472 may be configured to automatically fly to and land on one of the charging stations 460 and 462. In this regard, the drone devices 470 and 472 may automatically maintain a fully charged battery in a state in which the drone devices 470 and 472 are ready for use by the monitoring system 400.

The charging stations 460 and 462 may be contact based charging stations and/or wireless charging stations. For contact based charging stations, the drone devices 470 and 472 may have readily accessible points of contact that the drone devices 470 and 472 are capable of positioning and mating with a corresponding contact on the charging station. For instance, a helicopter type drone device may have an electronic contact on a portion of its landing gear that rests on and mates with an electronic pad of a charging station when the helicopter type drone device lands on the charging station. The electronic contact on the drone device may include a cover that opens to expose the electronic contact when the drone device is charging and closes to cover and insulate the electronic contact when the drone device is in operation.

For wireless charging stations, the drone devices 470 and 472 may charge through a wireless exchange of power. In these cases, the drone devices 470 and 472 need only locate themselves closely enough to the wireless charging stations for the wireless exchange of power to occur. In this regard, the positioning needed to land at a predefined home base or reference location in the property may be less precise than with a contact based charging station. Based on the drone devices 470 and 472 landing at a wireless charging station, the wireless charging station outputs a wireless signal that the drone devices 470 and 472 receive and convert to a power signal that charges a battery maintained on the drone devices 470 and 472.

In some implementations, the drone devices 470 and 472 may additionally be used to perform routine surveillance operations on a property location. For instance, the drone devices 470 and 472 may be assigned to one or more particular properties within a geographic location and may routinely collect surveillance footage during specified time periods (e.g., after dark), which may then be transmitted to the monitoring application server 490 for transmitting back to each particular property owner. In such implementations, the property owner may receive the surveillance footage over the network 405 as a part of a service provided by a security provider that operates the monitoring application server 490.

In some implementations, each of the drone devices 470 and 472 has a corresponding and assigned charging station 490 and 492 such that the number of drone devices 470 and 472 equals the number of charging stations 460 and 462. In these implementations, the drone devices 470 and 472 always navigate to the specific charging station assigned to that drone device. For instance, the drone device 470 may always use changing station 490 and the drone device 472 may always use changing station 492.

In some implementations, the drone devices 470 and 472 may share charging stations. For instance, the drone devices 470 and 472 may use one or more community charging stations that are capable of charging multiple drone devices 470 and 472. The community charging station may be configured to charge multiple drone devices 470 and 472 in parallel. The community charging station may be configured to charge multiple drone devices 470 and 472 in serial such that the multiple drone devices 470 and 472 take turns charging and, when fully charged, return to a predefined home base or reference location in the property that is not associated with a charger. The number of community charging stations may be less than the number of drone devices 470 and 472.

The charging stations 460 and 462 may be co-housed or placed nearby locations where alarm stations for properties may be located. For example, in some instances, the charging stations 460 and 462 may be placed within a particular location near a property such that the drone devices 470 and 472 may respond to an alarm signal generated by the alarm system of the property. In other instances, the charging stations 460 and 462 may be placed in particular locations within a community and configured to store drone devices 470 and 472 that service multiple properties within the community. For example, the charging stations 460 and 462 may be placed near elevated regions within a community such that the drone devices 470 and 472 may descend to a particular location within the community in response to an alarm event at the particular location within the community.

In some implementations, the charging stations 460 and 462 may additionally include solar panels to charge the drone devices 470 and 472 to conserve energy needed to charge the drone devices 470 and 472. In such implementations, the charging stations 460 and 462 may include controllers that are capable in adjusting the power source to the drone devices 470 and 472 to modulate charging speeds. For example, the charging stations 460 and 462 may use a high energy power source to charge the drone devices 470 and 472 at high speeds in anticipation of high volume of alarm events, and use a low energy power source to charge the drone devices 470 and 472 at low speeds during times when there is a low volume of alarm events (e.g., during times of low user activity).

Also, the charging stations 460 and 462 may not be assigned to specific drone devices 470 and 472 and may be capable of charging any of the drone devices 470 and 472. In this regard, the drone devices 470 and 472 may use any suitable, unoccupied charging station when not in use. For instance, when one of the drone devices 470 and 472 has completed an operation or is in need of battery charge, the monitoring system control unit 410-1 references a stored table of the occupancy status of each charging station and instructs the drone device to navigate to the nearest charging station that is unoccupied.

The sensors 420-1, the module 422-1, the camera 430-1, and the drone devices 470 and 472 communicate with the controller 412-1 over communication links 424, 426-1, and 428-1. The communication links 424, 426-1, and 428-1 may be a wired or wireless data pathway configured to transmit signals from the sensors 420-1, the module 422-1, the camera 430-1, and the drone devices 470 and 472 to the controller 412-1. The sensors 420-1, the module 422-1, the camera 430-1, and the drone devices 470 and 472 may continuously transmit sensed values to the controller 412-1, periodically transmit sensed values to the controller 412-1, or transmit sensed values to the controller 412-1 in response to a change in a sensed value.

The communication links 424, 426-1, and 428-1 may include a local network. The sensors 420-1, the module 422-1, the camera 430-1, and the drone devices 470 and 472 and the controller 412-1 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The central alarm station server 492 is an electronic device configured to provide alarm monitoring service by exchanging communications with the monitoring system control unit 410-1, the one or more mobile devices 440-1, 450, the monitoring application server 490, and the central alarm station server 492 over the network 405. For example, the central alarm station server 492 may be configured to monitor alarm events generated by the monitoring system control unit 410-1. In this example, the central alarm station server 492 may exchange communications with the network module 414-1 included in the monitoring system control unit 410-1 to receive information regarding alarm events detected by the monitoring system control unit 410-1. The central alarm station server 492 also may receive information regarding alarm events from the one or more mobile devices 440-1, 450, the monitoring application server 490, and/or the monitoring station server 494.

The central alarm station server 492 is connected to multiple terminals. The terminals may be used by operators to process alarm events. For example, the central alarm station server 492 may route alarm data to the terminals to enable an operator to process the alarm data. The terminals may include general-purpose computers (e.g., desktop personal computers, workstations, or laptop computers) that are configured to receive alarm data from a server in the central alarm station server 492 and render a display of information based on the alarm data. For instance, the controller 412-1 may control the network module 414-1 to transmit, to the central alarm station server 492, alarm data indicating that a sensor 420 detected a door opening when the monitoring system 400 was armed. The central alarm station server 492 may receive the alarm data and route the alarm data to a particular terminal of the one or more terminals for processing by an operator associated with the particular terminal. The particular terminal may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the monitoring application server 490 may route alarm data received from the network module 414-1 or the one or more user devices 440-1, 450 to the central alarm station server 492, the monitoring station server 494, or both. For example, the monitoring application server 490 may transmit the alarm data to the central alarm station server 492, the monitoring station server 494, or both, over the network 405.

The monitoring application server 490 may store sensor and image data received from the monitoring system and perform analysis of sensor and image data received from the monitoring system. Based on the analysis, the monitoring application server 490 may communicate with and control aspects of the monitoring system control unit 410-1 or the one or more user devices 440-1, 450.

In some implementations, the monitoring application server 490 may activate a collaborative network 480 that enables the monitoring application server 490 to obtain monitoring system data such as image data, sensor data or both from multiple different monitoring system 410-1 to 410-N that are part of respective local monitoring systems 405-1 to 405-N. The local monitoring systems 405-1 to 405-N may be installed at different respective properties. Once activated, the collaborative network 480 enables to the monitoring application server 490, central alarm station server 492, or monitoring station server 494 to analyze feeds from cameras 430-1 to 430-N as if the cameras 430-1 to 430-N were part of the same local monitoring network. For example, In response to determining that a break-in occurred at a property where location monitoring system 405-1 is installed, the monitoring application server 490 may be being obtaining monitoring system data such as sensor data, image data, or both, generated by sensors 420-N and cameras 430-N. In some implementations, drone device 470 can access information generated by the location monitoring system 405-1 and the location monitoring systems 405-N, and perform one or more operations based on the accessed information.

The monitoring application server 490 is connected to multiple terminals. The terminals may be used by operators to process alarm events. For example, the monitoring application server 490 may route alarm data to the terminals to enable an operator to process the alarm data. The terminals may include general-purpose computers (e.g., desktop personal computers, workstations, or laptop computers) that are configured to receive alarm data from a server in the monitoring application server 490 and render a display of information based on the alarm data. For instance, the controller 412-1 may control the network module 414-1 to transmit, to the monitoring application server 490, alarm data indicating that a sensor 420-1 detected a door opening when the monitoring system was armed. The monitoring application server 490 may receive the alarm data and route the alarm data to the terminal for processing by an operator associated with the terminal. The terminal may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals may be mobile devices or devices designed for a specific function. Although FIG. 4 illustrates two terminals for brevity, actual implementations may include more (and, perhaps, many more) terminals.

In some implementations, the monitoring application server 490 may exchange communications with an emergency service provider to transmit alarm signal data indicating an alarm event taking place within a property where the monitor control unit 410-1 may be located. For instance, the monitoring application server 490 may transmit incident reports in response to the monitor control unit 410-1 detecting an alarm event where a user requires emergency assistance. In such instances, the monitoring application server 490 may be an electronic device that communicates essential safety information to an emergency responder such as an emergency medical responder, a fire department, or a public safety access point.

In some implementations, the monitoring application server 490 may be a third party entity separate from the central alarm station server 492 and monitoring station server 494. For example, the monitoring application server 490 may be a central alarm station for a security service provider, a campus security server in a school or school/university police department, or security gateway for a particular residential neighborhood. For instance, the monitoring application server 490 may be registered to the system 400 using a connection bridge such as the application (e.g., the native surveillance application 442-1), using a unique user identifier such as a username and password or a Quick Response (QR). In other instances, the monitoring application server 490 may be registered to users within a particular geographic location (e.g., a gated residential community) where users within the geographical location are registered to a particular monitoring application server 490, a particular central alarm station server 492 of the particular location, a particular monitoring station server 494 of the particular location, or the like.

The one or more user devices 440-1, 450 are devices that host and display user interfaces. For instance, the user device 440-1 is a mobile device that hosts one or more native applications (e.g., the native surveillance application 442-1). The user device 440-1 may be a cellular phone or a non-cellular locally networked device with a display. The user device 440-1 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440-1 may perform functions unrelated to the monitoring system, such as placing personal telephone calls, playing music, playing video, displaying pictures, browsing the Internet, maintaining an electronic calendar, etc.

The user device 440-1 includes a native surveillance application 442-1. The native surveillance application 442-1 refers to a software/firmware program running on the corresponding mobile device that enables the user interface and features described throughout. The user device 440-1 may load or install the native surveillance application 442-1 based on data received over a network or data received from local media. The native surveillance application 442-1 runs on mobile devices platforms, such as iPhone, iPod touch, Blackberry, Google Android, Windows Mobile, etc. The native surveillance application 442-1 enables the user device 440-1 to receive and process image and sensor data from the monitoring system.

The user device 450 may be a general-purpose computer (e.g., a desktop personal computer, a workstation, or a laptop computer) that is configured to communicate with the monitoring application server 490 and/or the monitoring system control unit 410-1 over the network 405. The user device 450 may be configured to display a surveillance monitoring user interface 452 that is generated by the user device 450 or generated by the monitoring application server 490. For example, the user device 450 may be configured to display a user interface (e.g., a web page) provided by the monitoring application server 490 that enables a user to perceive images captured by the camera 430-1 and/or reports related to the monitoring system. Although FIG. 4 illustrates two user devices for brevity, actual implementations may include more (and, perhaps, many more) or fewer user devices.

In some implementations, the one or more user devices 440-1, 450 communicate with and receive monitoring system data from the monitoring system control unit 410-1 using the communication link 438. For instance, the one or more user devices 440-1, 450 may communicate with the monitoring system control unit 410-1 using various local wireless protocols such as Wi-Fi, Bluetooth, Z-Wave, Zig-Bee, HomePlug (Ethernet over powerline), or wired protocols such as Ethernet and USB, to connect the one or more user devices 440-1, 450 to local security and automation equipment. The one or more user devices 440-1, 450 may connect locally to the monitoring system and its sensors and other devices. The local connection may improve the speed of status and control communications because communicating through the network 105 with a remote server (e.g., the monitoring application server 490) may be significantly slower.

Although the one or more user devices 440-1, 450 are shown as communicating with the monitoring system control unit 410-1, the one or more user devices 440-1, 450 may communicate directly with the sensors and other devices controlled by the monitoring system control unit 410-1. In some implementations, the one or more user devices 440-1, 450 replace the monitoring system control unit 410-1 and perform the functions of the monitoring system control unit 410-1 for local monitoring and long range/offsite communication.

In other implementations, the one or more user devices 440-1, 450 receive monitoring system data captured by the monitoring system control unit 410-1 through the network 405. The one or more user devices 440-1, 450 may receive the data from the monitoring system control unit 410-1 through the network 405 or the monitoring application server 490 may relay data received from the monitoring system control unit 410-1 to the one or more user devices 440-1, 450 through the network 405. In this regard, the monitoring application server 490 may facilitate communication between the one or more user devices 440-1, 450 and the monitoring system.

In some implementations, the one or more user devices 440-1, 450 may be configured to switch whether the one or more user devices 440-1, 450 communicate with the monitoring system control unit 410-1 directly (e.g., through link 438) or through the monitoring application server 490 (e.g., through network 405) based on a location of the one or more user devices 440-1, 450. For instance, when the one or more user devices 440-1, 450 are located close to the monitoring system control unit 410-1 and in range to communicate directly with the monitoring system control unit 410-1, the one or more user devices 440-1, 450 use direct communication. When the one or more user devices 440-1, 450 are located far from the monitoring system control unit 410-1 and not in range to communicate directly with the monitoring system control unit 410-1, the one or more user devices 440-1, 450 use communication through the monitoring application server 490.

Although the one or more user devices 440-1, 450 are shown as being connected to the network 105, in some implementations, the one or more user devices 440-1, 450 are not connected to the network 405. In these implementations, the one or more user devices 440-1, 450 communicate directly with one or more of the monitoring system components and no network (e.g., Internet) connection or reliance on remote servers is needed.

In some implementations, the one or more user devices 440-1, 450 are used in conjunction with only local sensors and/or local devices in a house. In these implementations, the system 400 only includes the one or more user devices 440-1, 450, the sensors 420-1, the module 422-1, the camera 430-1, and the drone devices 470 and 472. The one or more user devices 440-1, 450 receive data directly from the sensors 420-1, the module 422-1, the camera 430-1, and the drone devices 470 and 472 and sends data directly to the sensors 420-1, the module 422-1, the camera 430-1, and the drone devices 470 and 472. The one or more user devices 440-1, 450 provide the appropriate interfaces/processing to provide visual surveillance and reporting.

In other implementations, the system 400 further includes network 405 and the sensors 420-1, the module 422-1, the camera 430-1, and the drone devices 470 and 472 are configured to communicate sensor and image data to the one or more user devices 440-1, 450 over network 405 (e.g., the Internet, cellular network, etc.). In yet another implementation, the sensors 420-1, the module 422-1, the camera 430-1, and the drone devices 470 and 472 (or a component, such as a bridge/router) are intelligent enough to change the communication pathway from a direct local pathway when the one or more user devices 440-1, 450 are in close physical proximity to the sensors 420-1, the module 422-1, the camera 430-1, and the drone devices 470 and 472 to a pathway over network 405 when the one or more user devices 440-1, 450 are farther from the sensors 420-1, the module 422-1, the camera 430-1, and the drone devices 470 and 472. In some implementations, the system leverages GPS information from the one or more user devices 440-1, 450 to determine whether the one or more user devices 440-1, 450 are close enough to the sensors 420-1, the module 422-1, the camera 430-1, and the drone devices 470 and 472 to use the direct local pathway or whether the one or more user devices 440-1, 450 are far enough from the sensors 420-1, the module 422-1, the camera 430-1, and the drone devices 470 and 472 that the pathway over network 405 is required. In other examples, the system leverages status communications (e.g., pinging) between the one or more user devices 440-1, 450 and the sensors 420-1, the module 422-1, the camera 430-1, and the drone devices 470 and 472 to determine whether communication using the direct local pathway is possible. If communication using the direct local pathway is possible, the one or more user devices 440-1, 450 communicate with the sensors 420-1, the module 422-1, the camera 430-1, and the drone devices 470 and 472 using the direct local pathway. If communication using the direct local pathway is not possible, the one or more user devices 440-1, 450 communicate with the sensors 420-1, the module 422-1, the camera 430-1, and the drone devices 470 and 472 using the pathway over network 405.

In some implementations, the system 400 provides end users with access to images captured by the camera 430-1 to aid in decision making. The system 400 may transmit the images captured by the camera 430-1 over a wireless WAN network to the user devices 440-1, 450. Because transmission over a wireless WAN network may be relatively expensive, the system 400 uses several techniques to reduce costs while providing access to significant levels of useful visual information.

In some implementations, a state of the monitoring system and other events sensed by the monitoring system may be used to enable/disable video/image recording devices (e.g., the camera 430-1). In these implementations, the camera 430-1 may be set to capture images on a periodic basis when the alarm system is armed in an "Away" state, but set not to capture images when the alarm system is armed in a "Stay" state or disarmed. In addition, the camera 430-1 may be triggered to begin capturing images when the alarm system detects an event, such as an alarm event, a door opening event for a door that leads to an area within a field of view of the camera 430-1, or motion in the area within the field of view of the camera 430-1. In other implementations, the camera 130 may capture images continuously, but the captured images may be stored or transmitted over a network when needed.

In some implementations, the drone devices 470 and 472 may analyze the images captured during the scan of a property for the presence of persons in the captured images. For instance, the drone devices 470 and 472 may use image processing techniques in an attempt to identify shapes in the captured images that resemble a human body. The drone devices 470 and 472 also may analyze the images for moving objects (or use other techniques to identify moving objects) and target imaging on capture of moving objects.

Based on detection of a human or a moving object, the drone devices 470 and 472 may lock onto the human or moving object and follow the human or moving object throughout the property. In this regard, the drone devices 470 and 472 may follow the human or moving object throughout the property and capture images of the movement. In addition, once one of the drone devices 470 and 472 locks onto a human or moving object, the drone devices 470 and 472 coordinate to ensure that multiple of the drone devices 470 and 472 do not lock onto the same human or moving object. The coordination may be direct amongst the drone devices 470 and 472 and/or through the monitoring system control unit 410-1. The coordination may involve sharing the location of the human or moving object and/or attributes of the human or moving object being imaged. Based on the shared location and attributes, the drone devices 470 and 472 may determine whether multiple drone devices 470 and 472 have locked onto the same object and take action accordingly. If the drone devices 470 and 472 determine that the drone devices 470 and 472 have not locked onto the same object, the appropriate one of the drone devices 470 and 472 continues to lock onto the object while the other drone devices scan other areas of the property for other objects. If the drone devices 470 and 472 determine that the drone devices 470 and 472 have locked onto the same object, the drone devices 470 and 472 negotiate to determine which of the drone devices 470 and 472 will continue to lock onto the object while the other drone devices stop locking onto the object and scan other areas of the property for other objects. The negotiation may select the drone device that continues tracking the object based on one or more factors including the timing of when the devices locked onto the object (e.g., which device locked onto the object first), the positioning of the devices relative to the object (e.g., which is best positioned to image the object), the amount of battery power remaining (e.g., the device with the most battery power remaining), or any other factor that indicates the device most suited to track the object. To the extent the device tracking an object becomes less suitable for tracking the object (e.g., the battery power is running low), the drone devices 470 and 472 may coordinate to hand off tracking of the object to another one of the drone devices 470 and 472.

In some implementations, the drone devices 470 and 472 perform image recognition processing on the one or more images in an attempt to detect whether any identified humans are legitimate users of the property or intruders. In these examples, the drone devices 470 and 472 may have access to images of legitimate users of the property and may compare images being captured to the accessed images of legitimate users. Based on the comparison, the drone devices 470 and 472 use facial recognition techniques to determine whether the imaged user matches a legitimate user of the property or an intruder. The drone devices 470 and 472 then use the determination of whether the imaged user matches a legitimate user of the property or an intruder to control further tracking operation.

For example, based on a determination that the imaged user is a trespasser, the drone devices 470 and 472 may continue tracking the intruder and ensure that images sufficient to identify the trespasser have been captured. In this example, the drone devices 470 and 472 may attempt to capture biometric data from the intruder, such as voiceprint data, fingerprint data, and/or biological samples with DNA of the intruder. In addition, the drone devices 470 and 472 may take action to thwart the purpose of the intruder. For example, the drone devices 470 and 472 may fly in random patterns around the intruder, may play loud sounds near the intruder, may shine lights near the intruder, may output identifying information collected about the intruder (e.g., male, around six feet tall and one hundred eighty pounds), or the like.

Alternatively, based on a determination that the imaged user is a legitimate user, the drone devices 470 and 472 may discontinue tracking the legitimate user and scan for intruders. The drone devices 470 and 472 also may report the location of the legitimate user. The drone devices 470 and 472 further may continue tracking the legitimate user and attempt to provide assistance to the user. For instance, if the alarm is a fire alarm event, the drone devices 470 and 472 may stay near the legitimate user, continuously or periodically update the location of the legitimate user to assist another user or first responder in helping the legitimate user, provide audible reminders of what types of actions should be taken in a fire, and may take other actions directed to assisting the legitimate user.

In some implementations, the monitoring application server 490, central alarm station server 492, or monitoring station server 494 may monitor operational status of the drone devices 470 and 472 and coordinate further operation based on the operational status. In these implementations, the monitoring application server 490, central alarm station server 492, or monitoring station server 494 may detect that a particular drone device is no longer operational and control one or more other drone devices to perform operations originally assigned to the non-operational drone device. In addition, the monitoring application server 490, central alarm station server 492, or monitoring station server 494 may determine that the non-operational drone device was navigating close to an intruder and received an impact based on accelerometer data prior to becoming non-operational. In this case, the monitoring application server 490 may infer that the drone device was smashed by the intruder and control other drone devices based on the inference. For instance, after inferring a smash event, the monitoring application server 490 may control operation of other drone devices to maintain distance from the intruder by only flying high overhead.

In some implementations, the monitoring application server 490 may determine battery power available for each of the drone devices 470 and 472 and coordinate operation of the drone devices 470 and 472 based on available battery power. In these implementations, the drone devices 470 and 472 may report battery power remaining to the monitoring application server 490 and the monitoring application server 490 may determine a subset of the drone devices 470 and 472 to deploy based on the battery power information. For instance, the monitoring application server 490 may select to initially deploy the drone device with the most available battery power to allow the other drone devices to charge while the selected device assists with monitoring. Once the battery power for the selected device falls below a threshold, the monitoring application server 490 may return the selected device to a charging station and select the drone device with the presently highest available battery power to resume the monitoring options being performed. The monitoring application server 490 may cycle through all of the drone devices 470 and 472 in an intelligent manner that best leverages the battery power available. If the battery power of a device becomes too low to effectively operate as a navigating device, the monitoring application server 490 may control the drone device to remain stationary and act as a stationary camera or other sensor to still assist with monitoring, although the added benefit of navigation no longer exists.

In addition to battery, the monitoring application server 490 may select the drone device to deploy and what action to take based on the sensor that triggered the event, a time of day, and a state of the system. For instance, if the monitoring application server 490 detects an unusual motion sensor event, the monitoring application server 490 may select the nearest drone device to navigate to an area of the property where motion was detected and investigate. Alternatively, if the monitoring application server 490 detects a critical alarm event (e.g., a security breach of a system armed stay, a fire alarm, a carbon monoxide alarm, etc.), the monitoring application server 490 may deploy all drone devices 470 and 472 at any time of the day. If the monitoring application server 490 detects an intrusion breach, the monitoring application server 490 may assign some devices to "attack" the intruder by disrupting the purpose of the intruder and collecting identifying information for the intruder and assign some devices to search for other users in the property. The selected devices and actions taken may vary based on sensor data, time of day, and the state of the monitoring system.

In some implementations, the system 400 allows drone base station operators, first responders, and/or users of the property to interact with and control the drone devices 470 and 472. In these implementations, a drone base station operator, first responder, or user of the property may provide input to control the drone devices 470 and 472 in a manner that best assists with monitoring and investigation of detected events. For instance, the drone base station operator, first responder, or user of the property may remotely control navigation of the drone devices 180 and 472. The drone base station operator, first responder, or user of the property also may provide general commands related to actions the drone devices 470 and 472 are designed to take. In response to these general commands, the drone devices 470 and 472 may automatically perform the desired actions, such as following an instruction to explore the property or following an instruction to navigate to an upstairs bedroom.

In some implementations, the drone devices 470 and 472 may be operated independently of the monitoring application server 490. For instance, in such implementations, the drone devices 470 and 472 may be operated locally by a community-based organization (e.g., neighborhood watch) that provides local security and surveillance of a neighborhood without a security provider. In such implementations, the drone devices 470 and 472 may be configured to exchange communications with each of the monitor control units 410-1 associated with the properties within the neighborhood. In this regard, the drone devices 470 and 472 may be used to provide surveillance of properties within a neighborhood without the use of a security provider.

The invention claimed is:

1. A method performed by one or more computing devices, the method comprising:
   obtaining data indicating an event was detected at a property;
   providing, to a drone device, a first instruction to navigate a) to an area that includes the property and b) along an initial navigation path in response to obtaining the data indicating the event;
   obtaining, from the drone device, data for a spatial representation of the area that includes the property, the data for the spatial representation indicating, for each of a set of surveillance operations, a respective location within the area that is associated with the surveillance operation;
   adjusting the initial navigation path using the data for the spatial representation to determine an adjusted navigation path; and
   providing, to the drone device, a second instruction to navigate along the adjusted navigation path to a particular location within the area that is associated with a particular surveillance operation of the set of surveillance operations.

2. The method of claim 1, further comprising:
   determining an order of prioritization for the drone device to execute the set of surveillance operations; and
   wherein the second instruction specifies the order of prioritization.

3. The method of claim 2, wherein:
   each surveillance operation of the set of surveillance operations includes obtaining an image of an object of a set of objects, each object of the set of objects having a respective location in the area, the method comprising:
      determining, for each object of the set of objects, a level of camera coverage for the respective location of the object; and
      determining the order of prioritization for the drone device to execute the set of surveillance operations using the levels of camera coverage for the respective locations of the set of objects.

4. The method of claim 2, comprising selecting the particular surveillance operation from the set of surveillance operations using the order of prioritization.

5. The method of claim 4, the selecting comprising:
   identifying, using the order of prioritization, a first surveillance operation that has a higher order of priority than the particular surveillance operation;
   determining that the first surveillance operation has already been completed; and
   in response to determining that the first surveillance operation has already been completed, selecting the particular surveillance operation.

6. The method of claim 1, wherein the spatial representation comprises a three-dimensional model of the area.

7. The method of claim 1, wherein:
   the spatial representation identifies a predicted travel path of a human in the area; and
   the initial navigation path is adjusted based on the predicted travel path of the human identified in the spatial representation.

8. The method of claim 1, further comprising:
   after obtaining the spatial representation, receiving an indication of a present location of the drone device in the area; and
   wherein the initial navigation path is adjusted based on the present location of the drone device in the area.

9. The method of claim 1, wherein the particular surveillance operation comprises obtaining an image of a particular object in the area.

10. The method of claim 9, comprising selecting the particular surveillance operation, including:
    determining, using image data received from the drone device, that no images have been obtained of the particular object in the area;
    in response to determining that no images have been obtained of the particular object in the area, determining that the particular surveillance operation has not yet been completed; and
    selecting the particular surveillance operation in response to determining that the particular surveillance operation has not yet been completed.

11. A system comprising:
    one or more computing devices; and
    one or more storage devices storing instructions that cause the one or more computing devices to perform operations comprising:
       obtaining data indicating an event was detected at a property;
       providing, to a drone device, a first instruction to navigate a) to an area that includes the property and b) along an initial navigation path in response to obtaining the data indicating the event;
       obtaining, from the drone device, data for a spatial representation of the area that includes the property, the data for the spatial representation indicating, for each of a set of surveillance operations, a respective location within the area that is associated with the surveillance operation;
       adjusting the initial navigation path using the data for the spatial representation to determine an adjusted navigation path; and
       providing, to the drone device, a second instruction to navigate along the adjusted navigation path to a particular location within the area that is associated with a particular surveillance operation of the set of surveillance operations.

12. The system of claim 11, wherein the operations further comprise:
    determining an order of prioritization for the drone device to execute the set of surveillance operations; and
    wherein the second instruction specifies the order of prioritization.

13. The system of claim 11, wherein the spatial representation comprises a three-dimensional model of the area.

14. The system of claim 11, wherein:
    the spatial representation identifies a predicted travel path of a human in the area; and
    the initial navigation path is adjusted based on the predicted travel path of the human identified in the spatial representation.

15. The system of claim 11, wherein the operations further comprise:
    after obtaining the spatial representation, receiving an indication of a present location of the drone device in the area; and
    wherein the initial navigation path is adjusted based on the present location of the drone device in the area.

16. At least one non-transitory computer-readable storage media storing instructions that are executable by one or more computing devices to perform operations comprising:
 obtaining data indicating an event was detected at a property;
 providing, to a drone device, a first instruction to navigate a) to an area that includes the property and b) along an initial navigation path in response to obtaining the data indicating the event;
 obtaining, from the drone device, data for a spatial representation of the area that includes the property, the data for the spatial representation indicating, for each of a set of surveillance operations, a respective location within the area that is associated with the surveillance operation;
 adjusting the initial navigation path using the data for the spatial representation to determine an adjusted navigation path; and
 providing, to the drone device, a second instruction to navigate along the adjusted navigation path to a particular location within the area that is associated with a particular surveillance operation of the set of surveillance operations.

17. The storage media of claim 16, wherein the operations further comprise:
 determining an order of prioritization for the drone device to execute the set of surveillance operations; and
 wherein the second instruction specifies the order of prioritization.

18. The storage media of claim 16, wherein the spatial representation comprises a three-dimensional model of the area.

19. The storage media of claim 16, wherein:
 the spatial representation identifies a predicted travel path of a human in the area; and
 the initial navigation path is adjusted based on the predicted travel path of the human identified in the spatial representation.

20. The storage media of claim 16, wherein the operations further comprise:
 after obtaining the spatial representation, receiving an indication of a present location of the drone device in the area; and
 wherein the initial navigation path is adjusted based on the present location of the drone device in the area.

* * * * *